United States Patent
Ni

(10) Patent No.: US 9,979,642 B2
(45) Date of Patent: May 22, 2018

(54) USER PACKET PROCESSING METHOD AND FORWARDING PLANE DEVICE

(71) Applicant: HUAWEI TECHNOLOGIES CO., LTD., Shenzhen (CN)

(72) Inventor: Hui Ni, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 148 days.

(21) Appl. No.: 15/048,131

(22) Filed: Feb. 19, 2016

(65) Prior Publication Data

US 2016/0173378 A1 Jun. 16, 2016

Related U.S. Application Data

(63) Continuation of application No. PCT/CN2013/081809, filed on Aug. 20, 2013.

(51) Int. Cl.
  *H04L 12/741* (2013.01)
  *H04L 12/64* (2006.01)
  *H04L 12/755* (2013.01)
  *H04L 12/715* (2013.01)

(52) U.S. Cl.
  CPC .......... *H04L 45/74* (2013.01); *H04L 12/6418* (2013.01); *H04L 45/021* (2013.01); *H04L 45/64* (2013.01)

(58) Field of Classification Search
  None
  See application file for complete search history.

(56) References Cited

U.S. PATENT DOCUMENTS

| 6,768,740 B1 | 7/2004 | Perlman et al. |
| 7,567,571 B2 | 7/2009 | Wybenga et al. |

(Continued)

FOREIGN PATENT DOCUMENTS

| CN | 102025643 A | 4/2011 |
| CN | 102930011 A | 2/2013 |

(Continued)

OTHER PUBLICATIONS

"OpenFlow Switch Specification", Version 1.1.0 Implemented (Wire Protocol 0x02), Feb. 28, 2011, 56 pages.

(Continued)

*Primary Examiner* — Kodzovi Acolatse
(74) *Attorney, Agent, or Firm* — Staas & Halsey LLP

(57) ABSTRACT

A user packet processing method is disclosed in which a forwarding plane device receives a flow entry installation message from a control plane device, writes the flow entries into the flow tables corresponding to the flow table identifiers, and performs a matching and processing procedure on the received user packet after the flow entries are written into the flow tables corresponding to the flow table identifiers; wherein the quantity of the flow entry installation messages is one, and the flow entry installation message carries all flow entries that may be needed to process a user packet, and a flow table identifier of a flow table in which each flow entry of all the flow entries is located. By using the foregoing manner, a case is effectively avoid that a forwarding plane device wrongly processes a user packet because of a network delay.

9 Claims, 6 Drawing Sheets

(56) References Cited

U.S. PATENT DOCUMENTS

| | | | |
|---|---|---|---|
| 2007/0116051 A1* | 5/2007 | Chen | H04L 29/12924 370/469 |
| 2009/0052445 A1 | 2/2009 | Folkes | |
| 2013/0016427 A1 | 1/2013 | Sugawara | |
| 2013/0163427 A1 | 6/2013 | Beliveau et al. | |
| 2013/0163602 A1* | 6/2013 | Kang | H04L 12/56 370/400 |
| 2013/0191530 A1* | 7/2013 | Zhang | H04L 43/08 709/224 |
| 2014/0040459 A1* | 2/2014 | Agrawal | H04L 45/14 709/224 |
| 2015/0009830 A1* | 1/2015 | Bisht | H04L 47/125 370/236 |
| 2015/0016449 A1* | 1/2015 | Tardo | H04L 47/2483 370/389 |
| 2015/0372902 A1* | 12/2015 | Giorgetti | H04L 45/64 370/219 |

FOREIGN PATENT DOCUMENTS

| | | |
|---|---|---|
| CN | 102938000 A | 2/2013 |
| EP | 1 345 459 A1 | 9/2003 |
| EP | 2806603 | 11/2014 |
| WO | WO2013108761 | 7/2013 |

OTHER PUBLICATIONS

European Office Action dated Jun. 29, 2016 in corresponding European Patent Application No. 13891883.4.
International Search Report dated May 21, 2014 in corresponding International Patent Application No. PCT/CN2013/081809.
International Search Report dated May 21, 2015, in corresponding International Application No. PCT/CN2013/081809.
Extended European Search Report, dated Oct. 12, 2016, in European Application No. 13891883.4 (18 pp.).
Chinese Office Action dated Aug. 2, 2017 in corresponding Chinese Patent Application No. 201380002701.2.

* cited by examiner

USER PACKET PROCESSING METHOD AND FORWARDING PLANE DEVICE

CROSS REFERENCE

This application is a continuation of International Application No. PCT/CN2013/081809, filed on Aug. 20, 2013, which is hereby incorporated by reference in its entirety.

TECHNICAL FIELD

Embodiments of the present invention relate to the field of communications technologies, and in particular, to a user packet processing method and a forwarding plane device.

BACKGROUND

A telecommunications network includes many network devices such as a router, a gateway, a switch, and a firewall. Each network device includes a packet forwarding module and a protocol control module, where the packet forwarding module is configured to forward a packet, and the protocol control module is configured to process a packet according to a protocol, to implement transmission of a packet between different network devices, thereby implementing network interconnection. Because network devices are distributed in different places, this manner of integrating a control function and a forwarding function into a network device makes network management much complex. For example, when a network needs to be upgraded, all network devices in different places on the network need to be upgraded, which is much inconvenient and time-consuming.

To deal with complexity of network management, an SDN (software defined network) network is introduced. The SDN network decouples a control module and a forwarding module that are in a network device, and deploys the control module in a centralized manner, so that network maintenance and management can be implemented on the side of the control module, which is simple and convenient.

On the SDN network, a forwarding function is deployed in a forwarding plane device, and a control function is deployed in a control plane device. The control plane device determines, according to content of a user packet, a flow entry that is needed to process the user packet, and sends the flow entry to the forwarding plane device by using a flow entry installation message. The forwarding plane device installs the flow entry into a flow table of the forwarding plane device, and processes the user packet by using the flow entry. According to an SDN network protocol such as the Openflow protocol, one flow entry installation message carries only one flow entry. If the forwarding plane device processes a user packet by means of multiple flow entries matching, the control plane device needs to send, to the forwarding plane device by using multiple flow entry installation messages, flow entries needed to process the user packet, and the forwarding plane device separately writes the flow entries into corresponding flow tables.

The inventor of this application finds in long-term studies that writing a flow entry into a flow table by a forwarding plane device and processing a user packet by the forwarding plane device are two independent processes; due to a network delay, flow entry installation messages do not reach the forwarding plane device synchronously, and the forwarding plane device is triggered to perform a matching and processing procedure on a user packet. As a result, the forwarding plane device processes the user packet in a case in which a flow entry is missing, thereby causing that the user packet processed by the forwarding plane device becomes erroneous.

SUMMARY

Implementation manners of the present invention mainly provide a user packet processing method and a forwarding plane device, which can effectively avoid a case in which a forwarding plane device wrongly processes a user packet because of a network delay.

According to a first aspect, a user packet processing method is provided, including: receiving, by a forwarding plane device, a flow entry installation message from a control plane device, where a quantity of the flow entry installation messages is one, and the flow entry installation message carries all flow entries that are needed to process a user packet, and a flow table identifier of a flow table in which each flow entry of all the flow entries is located; writing, by the forwarding plane device, the flow entries into the flow tables corresponding to the flow table identifiers; and after all the flow entries are written into the corresponding flow tables, performing, by the forwarding plane device, a matching and processing procedure on the received user packet.

With reference to the implementation manner of the first aspect, in a first possible implementation of the first aspect, before the step of receiving, by a forwarding plane device, a flow entry installation message from a control plane device, the method further includes: receiving, by the forwarding plane device, the user packet, buffering the user packet when it is found that a flow entry needed to process the user packet does not exist in a flow table of the forwarding plane device, and sending a flow entry request packet to the control plane device, where the flow entry request packet carries at least a part of content of the user packet, and a buffer address in which the user packet is buffered; the step of receiving, by a forwarding plane device, a flow entry installation message from a control plane device is specifically: receiving, by the forwarding plane device, the flow entry installation message that is delivered by the control plane device according to the flow entry request packet, where the flow entry installation message further carries the buffer address in which the user packet is buffered; and the step of performing, by the forwarding plane device, a matching and processing procedure on the received user packet includes: extracting, by the forwarding plane device, the user packet from buffer space corresponding to the buffer address, and performing the matching and processing procedure on the user packet.

With reference to the implementation manner of the first aspect, in a second possible implementation of the first aspect, the step of receiving, by a forwarding plane device, a flow entry installation message from a control plane device includes: receiving, by the forwarding plane device, the flow entry installation message that is delivered by the control plane device according to triggering by user subscription information, a local policy, or an external message.

According to a second aspect, a user packet processing method is provided, including: receiving, by a forwarding plane device, a flow entry installation message from a control plane device, where the flow entry installation message carries a flow entry that is needed to process a user packet, a flow table identifier of a flow table in which the flow entry is located, and an idle mark; after the forwarding plane device writes the flow entry into the flow table corresponding to the flow table identifier, setting, by the forwarding plane device according to the idle mark, a state of the flow entry in the flow table corresponding to the flow table identifier to an idle state; after all flow entries needed to process the user packet are written into corresponding flow tables, receiving, by the forwarding plane device, an activation message from the control plane device; and setting, by the forwarding plane device according to the activation message, states of all the flow entries that are in the forwarding plane device and used for processing the user packet to an active state, and performing a matching and processing procedure on the received user packet.

With reference to the implementation manner of the second aspect, in a first possible implementation of the second aspect, there are multiple flow entry installation messages, and one flow entry installation message carries only one flow entry that is needed to process the user packet, one flow table identifier, and one idle mark.

With reference to the implementation manner of the second aspect or the first implementation manner of the second aspect, in a second possible implementation of the second aspect, the flow entry includes a match condition; the activation message carries match conditions in all the flow entries that are needed to process the user packet, and flow table identifiers of the flow tables in which the flow entries are located; and the step of setting, by the forwarding plane device according to the activation message, states of all the flow entries that are in the forwarding plane device and used for processing the user packet to an active state, and performing a matching and processing procedure on the received user packet includes: finding, by the forwarding plane device, a corresponding flow entry according to a flow table identifier and a match condition that are carried in the activation message, and setting a state of the flow entry to an active state; and after the states of all the flow entries that are needed to process the user packet have been set to an active state, performing, by the forwarding plane device, the matching and processing procedure on the received user packet.

With reference to the implementation manner of the second aspect or the first implementation manner of the second aspect, in a third possible implementation of the second aspect, the flow entry includes a flow entry identifier; the activation message carries flow entry identifiers of all the flow entries that are needed to process the user packet; and the step of setting, by the forwarding plane device according to the activation message, states of all the flow entries that are in the forwarding plane device and used for processing the user packet to an active state, and performing a matching and processing procedure on the user packet includes: finding, by the forwarding plane device, a corresponding flow entry according to a flow entry identifier that is carried in the activation message; setting a state of the flow entry to an active state; and after the states of all the flow entries that are needed to process the user packet have been set to an active state, performing, by the forwarding plane device, the matching and processing procedure on the received user packet.

With reference to any one of the second aspect to the third implementation manner of the second aspect, in a fourth possible implementation manner of the second aspect, the step of receiving, by a forwarding plane device, a flow entry installation message from a control plane device is specifically: receiving, by the forwarding plane device, the flow entry installation message that is delivered by the control plane device according to triggering by user subscription information, a local policy, or an external message.

With reference to any one of the second aspect to the third implementation manner of the second aspect, in a fifth possible implementation manner of the second aspect, before the step of receiving, by a forwarding plane device, a flow entry installation message from a control plane device, the method further includes: receiving, by the forwarding plane device, the user packet; and when it is found that a flow entry needed to process the user packet does not exist in a flow table of the forwarding plane device, sending a flow entry request packet to the control plane device, where the flow entry request packet carries at least a part of content of the user packet; and the step of receiving, by a forwarding plane device from a control plane device, a flow entry installation message related to a flow entry that is needed to process a user packet is specifically: receiving, by the forwarding plane device, the flow entry installation message that is delivered by the control plane device according to the flow entry request packet.

According to a third aspect, a forwarding plane device is provided, including: a first receiving module, configured to receive a flow entry installation message from a control plane device, where a quantity of the flow entry installation messages is one, and the flow entry installation message carries all flow entries that are needed to process a user packet, and a flow table identifier of a flow table in which each flow entry of all the flow entries is located; a writing module, configured to write the flow entries into the flow tables corresponding to the flow table identifiers; and a matching and processing module, configured to: after all the flow entries that are needed to process the user packet are written into the corresponding flow tables, perform a matching and processing procedure on the received user packet.

With reference to the implementation manner of the third aspect, in a first possible implementation of the third aspect, the forwarding plane device further includes a second receiving module, a query module, and a sending module, where the second receiving module is configured to receive the user packet; the query module is configured to query whether a flow entry needed to process the user packet exists in a flow table of the forwarding plane device; and the buffering and sending module is configured to: when the query module finds that the flow entry needed to process the user packet does not exist in the flow table of the forwarding plane device, buffer the user packet, and send a flow entry request packet to the control plane device, where the flow entry request packet carries at least a part of content of the user packet, and a buffer address in which the user packet is buffered, where the first receiving module is specifically configured to receive the flow entry installation message that is delivered by the control plane device according to the flow entry request packet, where the flow entry installation message further carries the buffer address in which the user packet is buffered; and the matching and processing module is specifically configured to: after all the flow entries needed to process the user packet are written into the corresponding flow tables, extract the user packet from buffer space corresponding to the buffer address, and perform the matching and processing procedure on the user packet.

With reference to the implementation manner of the third aspect, in a second possible implementation of the third aspect, the first receiving module is specifically configured to receive the flow entry installation message that is delivered by the control plane device according to triggering by user subscription information, a local policy, or an external message.

According to a fourth aspect, a forwarding plane device is provided, including: the forwarding plane device includes a processor, a bus, and a network interface, where both the processor and the network interface are connected to the bus; and the processor is configured to: receive a flow entry installation message from a control plane device through the network interface, where a quantity of the flow entry installation messages is one, and the flow entry installation message carries all flow entries that are needed to process a user packet, and a flow table identifier of a flow table in which each flow entry of all the flow entries is located; write the flow entries into the flow tables corresponding to the flow table identifiers; and after all the flow entries are written into the corresponding flow tables, perform a matching and processing procedure on the user packet that is received through the network interface.

According to a fifth aspect, a forwarding plane device is provided, including: a first receiving module, configured to receive a flow entry installation message from a control plane device, where the flow entry installation message carries a flow entry that is needed to process a user packet, a flow table identifier of a flow table in which the flow entry is located, and an idle mark; a state setting module, configured to: after the flow entry is written into the flow table corresponding to the flow table identifier, set, according to the idle mark, a state of the flow entry in the flow table corresponding to the flow table identifier to an idle state; a second receiving module, configured to: after all flow entries needed to process the user packet are written into corresponding flow tables, receive an activation message from the control plane device; and a matching and processing module, configured to set, according to the activation message, states of all the flow entries that are in the forwarding plane device and used for processing the user packet to an active state, and perform a matching and processing procedure on the received user packet.

With reference to the implementation manner of the fifth aspect, in a first possible implementation manner of the fifth aspect, there are multiple flow entry installation messages, and one flow entry installation message carries only one flow entry that is needed to process the user packet, one flow table identifier, and one idle mark.

With reference to the implementation manner of the fifth aspect or the first possible implementation manner of the fifth aspect, in a second possible implementation manner of the fifth aspect, the flow entry includes a match condition; the activation message carries match conditions in all the flow entries that are needed to process the user packet, and flow table identifiers of the flow tables in which the flow entries are located; and the matching and processing module is specifically configured to: find a corresponding flow entry according to a flow table identifier and a match condition that are carried in the activation message; set a state of the flow entry to an active state; and after the states of all the flow entries that are needed to process the user packet have been set to an active state, perform the matching and processing procedure on the received user packet.

With reference to the implementation manner of the fifth aspect or the first possible implementation manner of the fifth aspect, in a third possible implementation manner of the fifth aspect, the flow entry includes a flow entry identifier; the activation message carries flow entry identifiers of all the flow entries that are needed to process the user packet; and the matching and processing module is specifically configured to: find a corresponding flow entry according to a flow entry identifier that is carried in the activation message; set a state of the flow entry to an active state; and after the states of all the flow entries that are needed to process the user packet have been set to an active state, perform the matching and processing procedure on the received user packet.

With reference to any implementation manner of the implementation manner of the fifth aspect to the third implementation manner of the fifth aspect, in a fourth possible implementation of the fifth aspect, the first receiving module is specifically configured to receive the flow entry installation message that is delivered by the control plane device according to triggering by user subscription information, a local policy, or an external message.

With reference to any implementation manner of the implementation manner of the fifth aspect to the third implementation manner of the fifth aspect, in a fourth possible implementation of the fifth aspect, the forwarding plane device further includes a third receiving module, a query module, and a sending module, where the third receiving module is configured to receive the user packet; the query module is configured to query whether a flow entry needed to process the user packet exists in a flow table of the forwarding plane device; and the sending module is configured to send a flow entry request packet to the control plane device when the query module finds that a flow entry needed to process the user packet does not exist in a flow table of the forwarding plane device, where the flow entry request packet carries at least a part of content of the user packet, where the first receiving module is specifically configured to receive the flow entry installation message that is delivered by the control plane device according to the flow entry request packet.

According to a sixth aspect, a forwarding plane device is provided, including: a processor, a bus, and a network interface, where both the processor and the network interface are connected to the bus; and the processor is configured to: receive a flow entry installation message from a control plane device through the network interface, where the flow entry installation message carries a flow entry that is needed to process a user packet, a flow table identifier of a flow table in which the flow entry is located, and an idle mark; after the forwarding plane device writes the flow entry into the flow table corresponding to the flow table identifier, set, according to the idle mark, a state of the flow entry in the flow table corresponding to the flow table identifier to an idle state; after all flow entries needed to process the user packet are written into corresponding flow tables, receive an activation message from the control plane device; and set, according to the activation message, states of all the flow entries that are in the forwarding plane device and used for processing the user packet to an active state, and perform a matching and processing procedure on the user packet that is received through the network interface.

Beneficial effects of the implementation manners of the present invention are as follows: After a forwarding plane device writes all flow entries needed to process a user packet into corresponding flow tables, the flow entries that are in the forwarding plane device and used for processing the user packet are allowed to participate in a matching and processing procedure performed on the user packet. This effectively avoids that due to asynchronous installation of flow entries, flow entries needed by some service flows cannot participate in processing performed on the user packet because the flow entries are not yet written into flow tables, thereby avoiding that the user packet is not sufficiently processed and the user packet becomes erroneous. This also effectively avoids that due to a network reason, flow entry installation messages reach the forwarding plane device asynchronously, the flow entries for processing the user packet are also written into the corresponding flow tables asynchronously, and matching and processing performed on the user packet is triggered when some flow entries are not yet written into flow tables, thereby avoiding that the user packet is not sufficiently processed, and the user packet becomes erroneous.

DESCRIPTION OF EMBODIMENTS

The following describes the present invention in detail with reference to the accompanying drawings and implementation manners.

Figure 1:
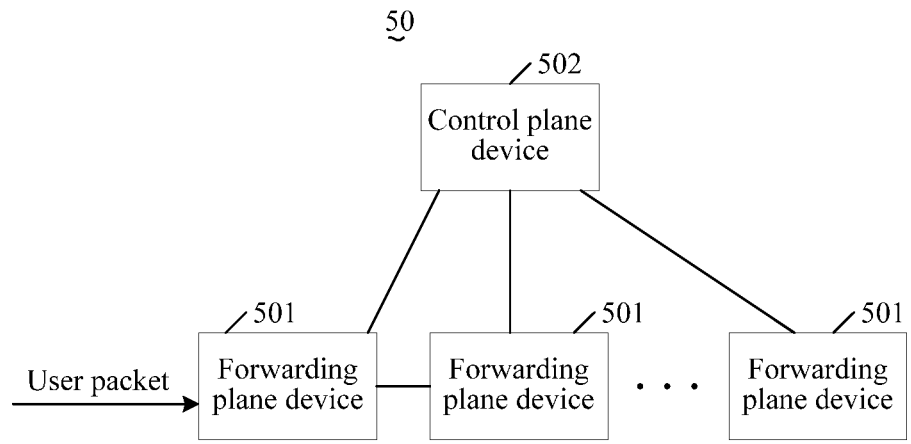
FIG. 1 is a schematic structural diagram of a software defined network system according to the present invention.

Referring to FIG. 1, FIG. 1 is a schematic structural diagram of a software defined network system according to the present invention. As shown in the figure, the system 50 includes a forwarding plane device 501 and a control plane device 502.

The forwarding plane device 501 receives a flow entry installation message from the control plane device 502, where the flow entry installation carries a flow entry that is needed to process a user packet, and a flow table identifier of a flow table in which the flow entry is located. The forwarding plane device 501 writes the flow entry into the flow table corresponding to the flow table identifier. After all flow entries that are needed to process the user packet are written into corresponding flow tables, the forwarding plane device 502 performs a matching and processing procedure on the received user packet.

In a possible implementation manner of the present invention, a quantity of the flow entry installation messages is one, and this flow entry installation message carries all flow entries that are needed to process the user packet, a flow table identifier of a flow table in which each flow entry is located, and a buffer address in which the user packet is buffered. After writing all the flow entries that are carried in the flow entry installation message into the corresponding flow tables, the forwarding plane device 501 extracts the user packet from buffer space corresponding to the buffer address, and performs a matching and processing procedure on the user packet. The forwarding plane device 501 may also not buffer the user packet, and in this case, the flow entry installation message does not carry the buffer address in which the user packet is buffered. However, because one flow entry installation message is used to carry the flow entries that are needed to process the user packet, and the forwarding plane device 501 writes all the flow entries that are carried in this flow entry installation message into the flow tables of the forwarding plane device 501 in an extremely short time, it may be basically considered that the flow entries are written simultaneously. Therefore, it is ensured that the flow entries that are needed to process the user packet are written into the corresponding flow tables simultaneously, avoiding that when multiple flow entry installation messages are used to carry all the flow entries that are needed to process the user packet, due to a network reason, the flow entry installation messages reach the forwarding plane device asynchronously, the flow entries for processing the user packet are also written into the corresponding flow tables asynchronously, and matching and processing performed on the user packet is triggered when some flow entries are not yet written into flow tables, thereby avoiding that the user packet is not sufficiently processed, and the user packet becomes erroneous.

In another implementation of the present invention, there are multiple flow entry installation messages, and a flow entry installation message carries a flow entry that is needed to process the user packet, a flow table identifier of a flow table in which the flow entry is located, and an idle mark. The forwarding plane device 501 sets a flow entry to an idle state while writing the flow entry into a flow table corresponding to a flow table identifier, so that the flow entry does not participate in processing performed on the user packet. After delivering all the flow entry installation messages to the forwarding plane device 501, the control plane device 502 sends an activation message to the forwarding plane device 501 after an interval of a predefined time, thereby ensuring that the activation message reaches the forwarding plane device 501 later than the flow entry installation messages, and ensuring that after writing all the flow entries that are needed to process the user packet into corresponding flow tables, the forwarding plane device 501 sets, according to the activation message, states of the flow entries that are in the forwarding plane device 501 and used for processing the user packet to an active state, so that the flow entries participate in a matching and processing procedure performed on the user packet. In this way, it is ensured that a matching and processing procedure is performed on the user packet only when complete flow entries that are used to process the user packet exist in the forwarding plane device 501, avoiding that due to a network reason, the flow entry installation messages reach the forwarding plane device asynchronously, the flow entries for processing the user packet are also written into the corresponding flow tables asynchronously, and matching and processing performed on the user packet is triggered when some flow entries are not yet written into flow tables, thereby avoiding that the user packet is not sufficiently processed, and the user packet becomes erroneous.

In this implementation manner of the present invention, the forwarding plane device 502 performs a matching and processing procedure on the received user packet only after writing all the flow entries that are needed to process the user packet into corresponding flow tables. In this way, it is ensured that a matching and processing procedure is performed on the user packet only when complete flow entries that are used to process the user packet exist in the forwarding plane device 501, avoiding that due to a network reason, the flow entry installation messages reach the forwarding plane device asynchronously, the flow entries for processing the user packet are also written into the corresponding flow tables asynchronously, and matching and processing performed on the user packet is triggered when some flow entries are not yet written into flow tables, thereby avoiding that the user packet is not sufficiently processed, and the user packet becomes erroneous.

Figure 2:
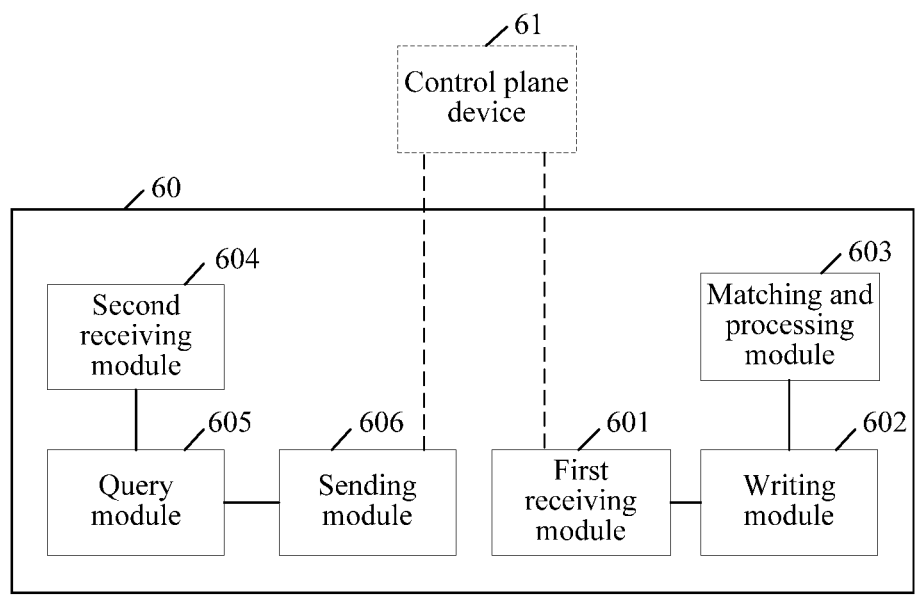
FIG. 2 is a schematic structural diagram of a first implementation manner of a forwarding plane device according to the present invention.

Referring to FIG. 2, FIG. 2 is a schematic structural diagram of a first implementation manner of a forwarding plane device according to the present invention. As shown in the figure, a forwarding plane device 60 includes: a first receiving module 601, a writing module 602, and a matching and processing module 603.

The first receiving module 601 receives a flow entry installation message from a control plane device 61, where a quantity of the flow entry installation messages may be one, and the flow entry installation message carries all flow entries that are needed to process a user packet, and a flow table identifier of a flow table in which each flow entry is located. The writing module 602 is configured to write the flow entries into the flow tables corresponding to the flow table identifiers. After all flow entries that are needed to process the user packet are written into corresponding flow tables, the matching and processing module 603 performs a matching and processing procedure on the received user packet.

Optionally, the flow entry installation message may be actively delivered by the control plane device 61, instead of being delivered at the request of the forwarding plane device 60. In this case, the first receiving module 301 may specifically receive the flow entry installation message that is delivered by the control plane device 61 according to triggering by user subscription information, a local policy, or an external message.

Optionally, the flow entry installation message may also be delivered at the active request of the forwarding plane device 60. In this case, the forwarding plane device 60 further includes a second receiving module 604, a query module 605, and a buffering and sending module.

The second receiving module 604 receives the user packet. The query module 604 queries whether a flow entry needed to process the user packet exists in a flow table of the forwarding plane device 60. When the query module 604 finds that the flow entry needed to process the user packet does not exist in the flow table of the forwarding plane device 60, the buffering and sending module 606 buffers the user packet, and sends a flow entry request packet to the control plane device 61, where the flow entry request packet carries at least a part of content of the user packet, and a buffer address in which the user packet is buffered. The at least a part of the content of the user packet is content according to which the control plane device 61 can define a flow entry that is needed to process the user packet, for example, an IP quintuple, an Ethernet frame header, or an identifier of a local area network. The first receiving module 601 is specifically configured to receive the flow entry installation message that is delivered by the control plane device 61 according to the flow entry request packet, where the flow entry installation message further carries the buffer address in which the user packet is buffered. The matching and processing module 603 is specifically configured to: after all the flow entries needed to process the user packet are written into the corresponding flow tables, extract the user packet from buffer space corresponding to the buffer address, and perform the matching and processing procedure on the user packet.

In this implementation manner of the present invention, a first receiving module 601 receives a flow entry installation message from a control plane device, and a writing module 602 writes all flow entries carried in the flow entry installation message into corresponding flow tables. A quantity of the flow entry installation messages is one, and the flow entry installation message carries all the flow entries that are needed to process a user packet; therefore, as a forwarding plane device 60 receives the flow entry installation message, the forwarding plane device 60 simultaneously receives all the flow entries that are needed to process the user packet. In addition, the forwarding plane device writes all the flow entries that are carried in the flow entry installation message into the corresponding flow tables in an extremely short time, and it may be basically considered that the flow entries are written simultaneously. Therefore, all the flow entries that are needed to process the user packet are written into the corresponding flow tables basically simultaneously, avoiding that when multiple flow entry installation messages are used to carry all the flow entries that are needed to process the user packet, due to a network reason, the flow entry installation messages reach the forwarding plane device asynchronously, the flow entries for processing the user packet are also written into the corresponding flow tables asynchronously, and matching and processing performed on the user packet is triggered when some flow entries are not yet written into flow tables, thereby avoiding that the user packet is not sufficiently processed, and the user packet becomes erroneous.

Figure 3:
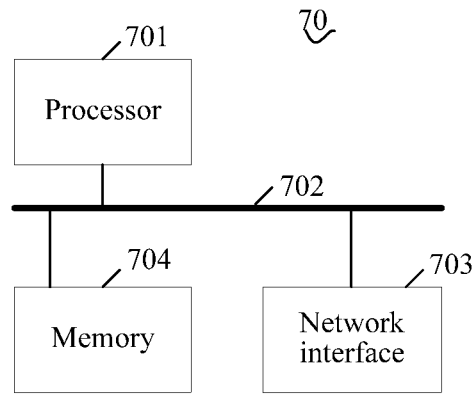
FIG. 3 is a schematic structural diagram of a second implementation manner of a forwarding plane device according to the present invention.
Figure 4:
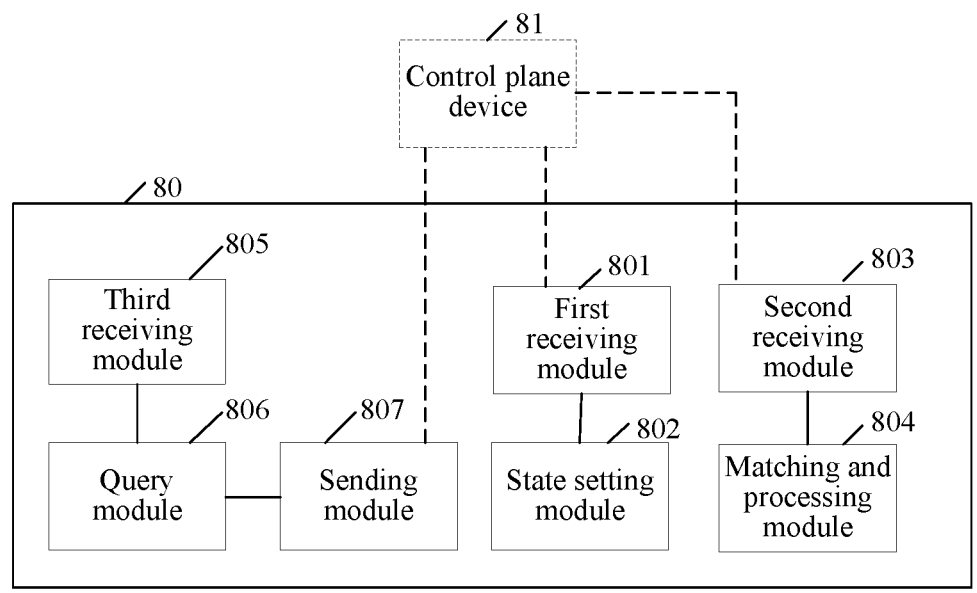
FIG. 4 is a schematic structural diagram of a third implementation manner of a forwarding plane device according to the present invention.

Referring to FIG. 3, FIG. 3 is a schematic structural diagram of a second implementation manner of a forwarding plane device according to the present invention. As shown in the figure, a forwarding plane device 70 includes a processor 701, a bus 702, and a network interface 703. Both the processor 701 and the network interface 703 are connected to the bus 702.

The processor 701 is configured to: receive a flow entry installation message from a control plane device through the network interface 703, where a quantity of the flow entry installation messages is one, and the flow entry installation message carries all flow entries that are needed to process a user packet, and a flow table identifier of a flow table in which each flow entry of all the flow entries is located; write the flow entries into the flow tables corresponding to the flow table identifiers; and after all the flow entries that are needed to process the user packet are written into the corresponding flow tables, perform a matching and processing procedure on the user packet that is received through the network interface 703.

Further, the forwarding plane device 70 further includes a memory 704. The foregoing processing process performed by the processor 701 may be completed under the control of a program, where the program is stored in the memory 704; and when the foregoing operations need to be performed, the program is loaded into the processor 701, so that the processor 501 controls implementation of the operations. Certainly, the foregoing processing process may also be performed by hardware.

Referring to FIG. 3, FIG. 3 is a schematic structural diagram of a third implementation manner of a forwarding plane device according to the present invention. As shown in the figure, a forwarding plane device 80 includes a first receiving module 801, a state setting module 802, a second receiving module 803, and a matching and processing module 804.

The first receiving module 801 receives a flow entry installation message from a control plane device 81, where the flow entry installation message carries a flow entry that is needed to process a user packet, a flow table identifier of a flow table in which the flow entry is located, and an idle mark. In a possible implementation manner of the present invention, there are multiple flow entry installation messages, and one flow entry installation message carries only one flow entry that is needed to process the user packet, one flow table identifier, and one idle mark.

Optionally, the flow entry installation message may be actively delivered by the control plane device 81. In this case, the first receiving module 801 may specifically receive the flow entry installation message that is delivered by the control plane device according to triggering by user subscription information, a local policy, or an external message.

Optionally, the flow entry installation message may also be delivered by the control plane device 81 at the request of the forwarding plane device. In this case, the forwarding plane device 80 further includes a third receiving module 805, a query module 806, and a sending module 807. The third receiving module 805 is configured to receive the user packet. The query module 806 is configured to query whether a flow entry needed to process the user packet exists in a flow table of the forwarding plane device 80. The sending module 807 is configured to: when the query module 806 finds that a flow entry needed to process the user packet does not exist in a flow table of the forwarding plane device 80, send a flow entry request packet to the control plane device 81, where the flow entry request packet carries at least a part of content of the user packet. The at least a part of content of the user packet is content according to which the control plane device can define, according to the at least a part of content, a flow entry for processing the user packet. When finding that the flow entry for processing the user packet does not exist, the forwarding plane device 80 does not buffer the user packet, and forwards the user packet in a default manner. The first receiving module 801 is specifically configured to receive the flow entry installation message that is delivered by the control plane device 81 according to the flow entry request packet.

After the flow entry is written into the flow table corresponding to the flow table identifier, the state setting module 802 sets, according to the idle mark, a state of the flow entry in the flow table corresponding to the flow table identifier to an idle state. That a flow entry is in an invalid state refers to that the flow entry does not participate in a matching and processing procedure performed on the user packet. The second receiving module 803 receives an activation message from the control plane device 81 after all flow entries needed to process the user packet are written into corresponding flow tables. After delivering all the flow entry installation messages that carry the flow entries that are needed to process the user packet, the control plane device 81 sends the activation message after an interval of a predefined time, to ensure that the activation message reaches the forwarding plane device 80 later than the flow entry installation messages. The matching and processing module 804 sets, according to the activation message, states of all the flow entries that are in the forwarding plane device and used for processing the user packet to an active state, and performs a matching and processing procedure on the received user packet.

Optionally, a flow entry includes a match condition and processing content, and the activation message carries match conditions in all the flow entries that are needed to process the user packet, and flow table identifiers of flow tables in which the flow entries are located. The matching and processing module 804 is specifically configured to: find a corresponding flow entry according to a flow table identifier and a match condition that are carried in the activation message; set a state of the flow entry to an active state; and after the states of all the flow entries that are needed to process the user packet have been set to an active state, perform the matching and processing procedure on the received user packet.

Optionally, the flow entry includes a flow entry identifier. A flow entry identifier is a unique mark of a flow entry. The activation message carries flow entry identifiers of all the flow entries that are needed to process the user packet, and the matching and processing module 804 is specifically configured to: find a corresponding flow entry according to a flow entry identifier that is carried in the activation message; set a state of the flow entry to an active state; and after the states of all the flow entries that are needed to process the user packet have been set to an active state, perform a matching and processing procedure on the received user packet.

In this implementation manner of the present invention, a flow entry installation message received by the first receiving module 801 further carries an idle mark in addition to a flow entry, and a flow table identifier of a flow table in which the flow entry is located. After a flow entry is written into a corresponding flow table, the state setting module sets a state of the flow entry to the idle state. When the flow entry is in an invalid state, the flow entry is not allowed to participate in matching and processing performed on a user packet. Although flow entry installation messages reach a forwarding plane device asynchronously because of a network delay, and further, flow entries for processing the user packet are also written into corresponding flow tables asynchronously, states of the flow entries that are already written into the forwarding plane device and used to process the user packet are invalid states, and the flow entries do not participate in a matching and processing procedure performed on the user packet, avoiding that the user packet is not sufficiently processed and the user packet becomes erroneous because matching and processing performed on the user packet is triggered in a case in which not all flow entries for processing the user packet are present. The second receiving module 803 receives an activation message after all the flow entries needed to process the user packet are written into the corresponding flow tables. The matching and processing module 804 sets, according to the activation message, the states of all the flow entries that are needed to process the user packet to an active state, to allow the flow entries to participate in processing performed on the user packet, so as to ensure that a matching and processing procedure is performed on the user packet only when complete flow entries that are used to process the user packet exist in the forwarding plane device, avoiding that the user packet is not sufficiently processed and the user packet becomes erroneous because matching and processing performed on the user packet is triggered in a case in which not all flow entries for processing the user packet are present.

Figure 5:
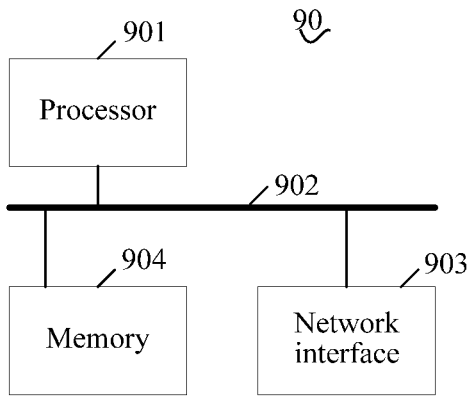
FIG. 5 is a flowchart of a first implementation manner of a user packet processing method according to the present invention.

Referring to FIG. 5, FIG. 5 is a schematic structural diagram of a fourth implementation manner of a forwarding plane device according to the present invention. As shown in the figure, a forwarding plane device 90 includes a processor 901, a bus 902, and a network interface 903. Both the processor 901 and the network interface 903 are connected to the bus 902.

The processor 901 is configured to: receive a flow entry installation message from a control plane device through the network interface 903, where the flow entry installation message carries a flow entry that is needed to process a user packet, a flow table identifier of a flow table in which the flow entry is located, and an idle mark; after the forwarding plane device 90 writes the flow entry into the flow table corresponding to the flow table identifier, set, according to the idle mark, a state of the flow entry in the flow table 5 corresponding to the flow table identifier to an idle state; after all flow entries needed to process the user packet are written into corresponding flow tables, receive an activation message from the control plane device 91; and set, according to the activation message, states of all the flow entries that are in the forwarding plane device 90 and used for processing the user packet to an active state, and perform a matching and processing procedure on the user packet that is received through the network interface 903.

Further, the forwarding plane device 90 further includes a memory 904. The foregoing processing process performed by the processor 901 may be completed under the control of a program, where the program is stored in the memory 904; and when the foregoing operations need to be performed, the program is loaded into the processor 901, so that the processor 901 controls implementation of the operations. Certainly, the foregoing processing process may also be performed by hardware.

Figure 6:
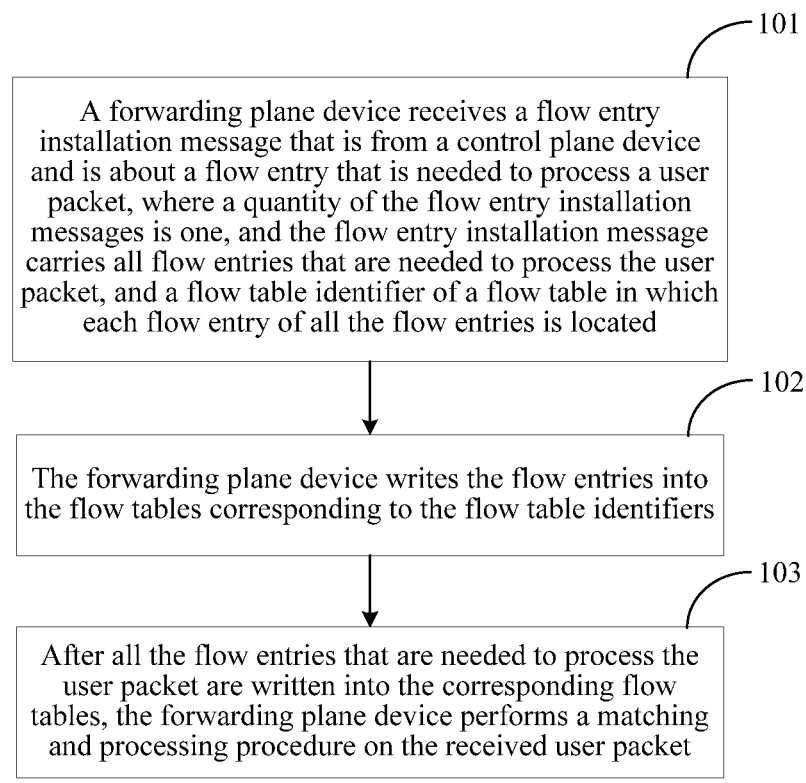
FIG. 6 is a flowchart of a second implementation manner of a user packet processing method according to the present invention.

Referring to FIG. 6, FIG. 6 is a flowchart of a first implementation manner of a user packet processing method according to the present invention. As shown in the figure, the method includes:

Step 101: A forwarding plane device receives a flow entry installation message from a control plane device, where a quantity of the flow entry installation messages is one, and the flow entry installation message carries all flow entries that are needed to process a user packet, and a flow table identifier of a flow table in which each flow entry is located.

The control plane device is responsible for logical control, and the forwarding plane device is responsible for packet processing. The control plane device delivers, to the forwarding plane device, a flow entry that is needed to process the user packet, and the forwarding plane device writes the flow entry into a corresponding flow table, and performs a matching and processing procedure on the user packet according to the flow entry in the flow table.

A flow entry includes a match condition and processing content, where the match condition is used to determine whether the user packet is an object to be processed by using the flow entry. One or more of a source/destination MAC address, an identifier of a local area network, a source/destination IP address, a TCP/UDP protocol type, a source/destination port number, a GRE key (generic routing encapsulation key), and a GTP TEID (generic routing encapsulation tunnel endpoint identifier) of the user packet may be used as the match condition, and the processing content is used to indicate processing such as forwarding, discarding, modification, encapsulation, or decapsulation performed on a matched user packet.

Generally, multiple flow tables are set in the forwarding plane device, and multiple flow entries are set in each flow table. When processing a user packet, the forwarding plane device generally needs to perform matching with multiple flow tables, and the forwarding plane device performs matching with multiple flow tables in a serial processing manner. For example, a user packet 1 needs to be processed by using a flow entry 1 in a flow table 0->a flow entry 3 in a flow table 3->a flow entry 2 in a flow table 5, and in this case, the user packet is first processed according to the flow entry 1 in the flow table 0, the user packet is then processed according to the flow entry 3 in the flow table 3, and the user packet is finally processed according to the flow entry 2 in the flow table 5. If a flow entry is missing, for example, the flow entry 3 in the flow table 3 is missing, the user packet 1 is not sufficiently processed, and as a result, the user packet 1 is wrongly processed.

Step 102: The forwarding plane device writes the flow entries into the flow tables corresponding to the flow table identifiers.

A flow table identifier is a unique identifier of a flow table in the forwarding plane device, and different flow tables are provided with flow table identifiers that uniquely identify the different flow tables.

Step 103: After all the flow entries that are needed to process the user packet are written into the corresponding flow tables, the forwarding plane device performs a matching and processing procedure on the received user packet.

When the forwarding plane device has received the flow entry installation message, and has not received the user packet, the forwarding plane device writes all the flow entries that are carried in the flow entry installation message into the corresponding flow tables. The forwarding plane device writes all the flow entries that are carried in the flow entry installation message into the corresponding flow tables in an extremely short time, and it may be basically considered that all the flow entries that are carried in the flow entry installation message are written into the corresponding flow tables simultaneously. Then, when receiving the user packet, the forwarding plane device may perform matching and processing on the user packet.

When the forwarding plane device has received the user packet before receiving the flow entry installation message, the forwarding plane device buffers the user packet in buffer space, applies to the control plane device for a flow entry for processing the user packet, extracts the user packet from the buffer space after all flow entries for processing the user packet are written into the corresponding flow tables, and performs matching and processing on the user packet.

In this implementation manner of the present invention, a forwarding plane device receives a flow entry installation message from a control plane device, and writes all flow entries carried in the flow entry installation message into corresponding flow tables. A quantity of the flow entry installation messages is one, and the flow entry installation message carries all the flow entries that are needed to process a user packet; therefore, as the forwarding plane device receives the flow entry installation message, the forwarding plane device simultaneously receives all the flow entries that are needed to process the user packet. In addition, the forwarding plane device writes all the flow entries that are carried in the flow entry installation message into the corresponding flow tables in an extremely short time, and it may be basically considered that the flow entries are written simultaneously. Therefore, all the flow entries that are needed to process the user packet are written into the corresponding flow tables basically simultaneously, avoiding that when multiple flow entry installation messages are used to carry all the flow entries that are needed to process the user packet, due to a network reason, the flow entry installation messages may not necessarily reach the forwarding plane device at the same time, the flow entries for processing the user packet are also written into the corresponding flow tables asynchronously, and matching and processing performed on the user packet is triggered when some flow entries are not yet written into flow tables, thereby avoiding that the user packet is not sufficiently processed, and the user packet becomes erroneous.

Figure 7:
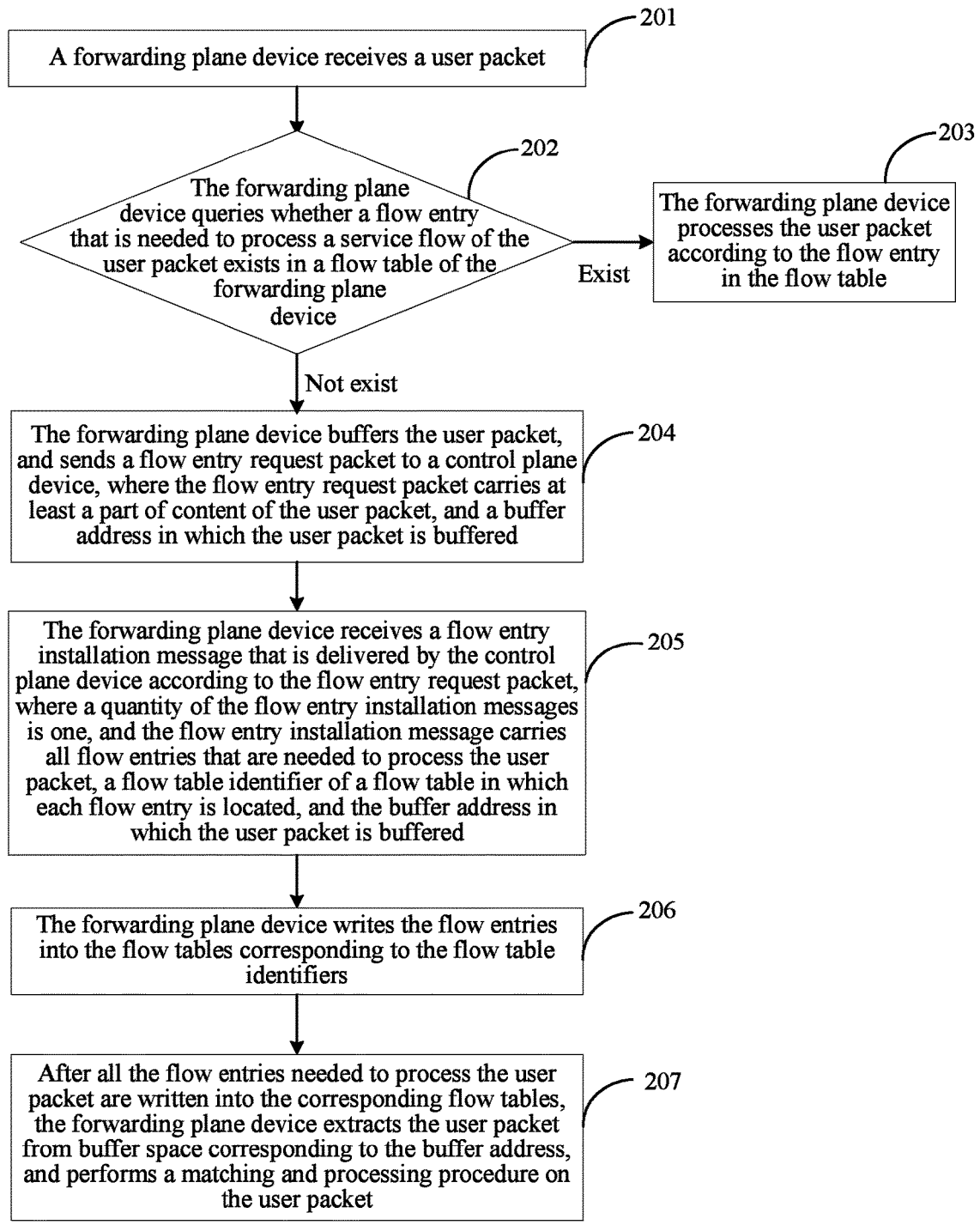
FIG. 7 is a flowchart of a third implementation manner of a user packet processing method according to the present invention.

Referring to FIG. 7, FIG. 7 is a flowchart of a second implementation manner of a user packet processing method according to the present invention. As shown in the figure, the method includes:

Step 201: A forwarding plane device receives a user packet.

A control plane device is responsible for logical control, the forwarding plane device is responsible for packet processing, and the forwarding plane device performs matching and processing on the user packet according to a flow entry that is delivered by the control plane device. A flow entry includes a match condition and processing content, where the match condition is used to determine whether the user packet belongs to an object to be processed by using the flow entry, and the processing content is used to indicate an action that is performed on a user packet that meets the match condition.

Step 202: The forwarding plane device queries whether a flow entry that is needed to process the user packet exists in a flow table of the forwarding plane device; and if the flow entry that is needed to process the user packet does not exist, perform step 204; otherwise, perform step 203.

Step 203: The forwarding plane device processes the user packet according to the flow entry in the flow table.

Step 204: The forwarding plane device buffers the user packet, and sends a flow entry request packet to a control plane device, where the flow entry request packet carries at least a part of content of the user packet, and a buffer address in which the user packet is buffered.

The at least a part of content of the user packet is content according to which the control plane device can define, according to the at least a part of content of the user packet after receiving the flow entry request packet, a flow entry that is needed to process the user packet, and the content is, for example, an IP quintuple, an Ethernet frame header, or an identifier of a local area network. After defining a flow entry for processing the user packet, the control plane device encapsulates, into a flow entry installation message, a flow entry, a flow table identifier of a flow table in which each flow entry is located, and a buffer address in which the user packet is buffered, and delivers the flow entry installation message to the forwarding plane device.

Step 205: The forwarding plane device receives a flow entry installation message that is delivered by the control plane device according to the flow entry request packet, where a quantity of the flow entry installation messages is one, and the flow entry installation message carries all flow entries that are needed to process the user packet, a flow table identifier of a flow table in which each flow entry is located, and the buffer address in which the user packet is buffered.

Generally, after receiving the flow entry installation message, the forwarding plane device first writes the flow entries that are carried in the flow entry installation message into corresponding flow tables, extracts the user packet from buffer space of the buffer address, and performs matching and processing on the user packet. If multiple flow entry installation messages are used to carry the flow entries for processing the user packet, it is probable that the flow entry installation messages reach the forwarding plane device at different times because of a network delay, and further, the flow entries for processing the user packet are also written into the corresponding flow tables at different times. Assuming that a flow entry installation message that carries the buffer address in which the user packet is buffered reaches the forwarding plane device earlier, and other flow entry installation messages reach the forwarding plane device later, it is possible that before flow entries that are carried in the other flow entry installation messages are written into corresponding flow tables, the user packet is extracted from the buffer space corresponding to the buffer address, and matching and processed is performed on the user packet, leading to that the user packet is not sufficiently processed, and further, the user packet is wrongly processed.

Step 206: The forwarding plane device writes the flow entries into the flow tables corresponding to the flow table identifiers.

A flow table identifier is a unique mark of a flow table in the forwarding plane device, and flow table identifiers are used to distinguish different flow tables.

Step 207: After all the flow entries needed to process the user packet are written into the corresponding flow tables, the forwarding plane device extracts the user packet from buffer space corresponding to the buffer address, and performs a matching and processing procedure on the user packet.

A quantity of the flow entry installation messages is one, and the flow entry installation message carries all the flow entries that are needed to process the user packet; therefore, as the forwarding plane device receives the flow entry installation message, the forwarding plane device simultaneously receives all the flow entries that are needed to process the user packet. In addition, the forwarding plane device writes all the flow entries that are carried in the flow entry installation message into the corresponding flow tables in an extremely short time, and it may be basically considered that the flow entries are written simultaneously. Therefore, it is ensured that all the flow entries that are needed to process the user packet are written into the corresponding flow tables basically simultaneously. Further, because the flow entry installation message further carries the buffer address in which the user packet is buffered, after the flow entries are written into the corresponding flow tables, the user packet is extracted from the buffer address, and matching and processing is performed.

Optionally, the control plane device may also actively deliver the flow entry installation message to the forwarding plane device, where a quantity of the forwarding plane devices is also one, and the flow entry installation message carries all the flow entries that are needed to process the user packet, and a flow table identifier of a flow table in which each flow entry is located. In this case, in this implementation manner of the present invention, step 201 to step 204 may also not be included, and step 205 may be specifically: the forwarding plane device receives the flow entry installation message that is delivered by the control plane device according to triggering by user subscription information, a local policy, or an external message, where a quantity of the forwarding plane devices is one, and the flow entry installation message carries all the flow entries that are needed to process the user packet, and a flow table identifier of a flow table in which each flow entry is located. Step 207 may also be specifically: after all the flow entries that are needed to process the user packet are written into the corresponding flow tables, the forwarding plane device performs a matching and processing procedure on the received user packet.

The control plane device adds, to one flow entry installation message, all the flow entries that are needed to process the user packet; therefore, as the forwarding plane device receives the flow entry installation message, the forwarding plane device simultaneously receives all the flow entries that are needed to process the user packet. In addition, the forwarding plane device writes all the flow entries that are carried in the flow entry installation message and are needed to process the user packet into the corresponding flow tables in an extremely short time, and it may be basically considered that the flow entries are written simultaneously. If the user packet reaches the forwarding plane device earlier than the flow entry installation message, the forwarding plane device processes the user packet in a default manner; if the forwarding plane device receives the flow entry installation message in a process of processing the user packet, the forwarding plane device still processes the user packet in a default manner; if the user packet is received after all the flow entries that are needed to process the user packet are written into the corresponding flow tables, a matching and processing procedure is performed on the user packet.

In this implementation manner of the present invention, a forwarding plane device receives a flow entry installation message from a control plane device, and writes all flow entries carried in the flow entry installation message into corresponding flow tables. A quantity of the flow entry installation messages is one, and the flow entry installation message carries all the flow entries that are needed to process a user packet; therefore, as the forwarding plane device receives the flow entry installation message, the forwarding plane device simultaneously receives all the flow entries that are needed to process the user packet. In addition, the forwarding plane device writes all the flow entries that are carried in the flow entry installation message into the corresponding flow tables in an extremely short time, and it may be basically considered that the flow entries are written simultaneously. Therefore, all the flow entries that are needed to process the user packet are written into the corresponding flow tables basically simultaneously, avoiding that when multiple flow entry installation messages are used to carry all the flow entries that are needed to process the user packet, due to a network reason, the flow entry installation messages reach the forwarding plane device asynchronously, the flow entries for processing the user packet are also written into the corresponding flow tables asynchronously, and matching and processing performed on the user packet may be triggered when some flow entries are not yet written into flow tables, thereby avoiding that the user packet is not sufficiently processed, and the user packet becomes erroneous.

Figure 8:
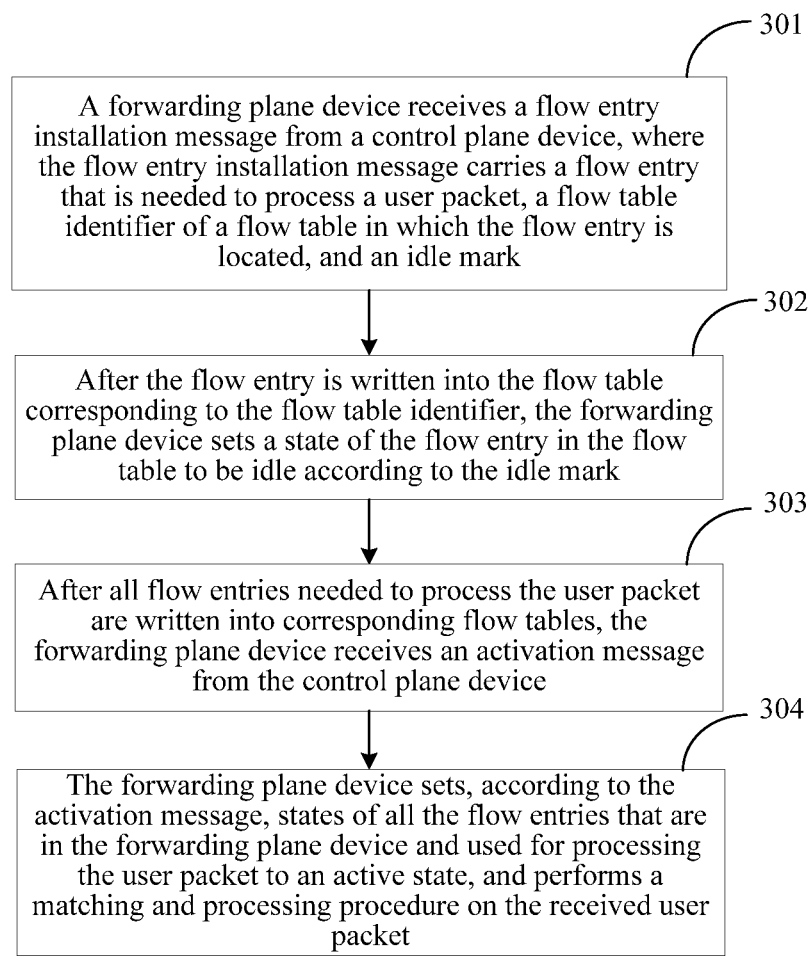
FIG. 8 is a flowchart of a fourth implementation manner of a user packet processing method according to the present invention.

Referring to FIG. 8, FIG. 8 is a flowchart of a third implementation manner of a user packet processing method according to the present invention. As shown in the figure, the method includes:

Step 301: A forwarding plane device receives a flow entry installation message from a control plane device, where the flow entry installation message carries a flow entry that is needed to process a user packet, a flow table identifier of a flow table in which the flow entry is located, and an idle mark.

The control plane device is responsible for logical control, and the forwarding plane device is responsible for packet processing. The control plane device delivers, to the forwarding plane device, a flow entry that is needed to process the user packet, and the forwarding plane device performs a matching and processing procedure on the user packet according to the flow entry delivered by the control plane device. A flow entry includes a match condition and processing content, where the match condition is used to determine whether the user packet belongs to an object to be processed by using the flow entry, and the processing content is used to indicate an action that is performed on a user packet that meets the match condition. In this implementation manner of the present invention, there are multiple flow entry installation messages, and one flow entry installation message carries only one flow entry that is needed to process the user packet, one flow table identifier, and one idle mark.

Step 302: After the flow entry is written into the flow table corresponding to the flow table identifier, the forwarding plane device sets, to an idle state according to the idle mark, a state of the flow entry in the flow table corresponding to the flow table identifier.

The idle mark is used to instruct the forwarding plane device to set the state of the flow entry in the flow table to the idle state after the forwarding plane device writes the flow entry into the corresponding flow table, and that a flow entry in the forwarding plane device is in the idle state refers to that the flow entry in the forwarding plane device does not participate in a matching and processing procedure performed on the user packet.

Step 303: After all flow entries needed to process the user packet are written into corresponding flow tables, the forwarding plane device receives an activation message from the control plane device.

After sending all the flow entry installation messages, the control plane device sends the activation message after an interval of a predefined time, to ensure that the activation message reaches the forwarding plane device later than the flow entry installation messages, thereby ensuring that the forwarding plane device activates the flow entries that are in the forwarding plane device and used for processing the user packet according to the activation message only after all the flow entries needed to process the user packet are written into the corresponding flow tables.

Step 304: The forwarding plane device sets, according to the activation message, states of all the flow entries that are in the forwarding plane device and used for processing the user packet to an active state, and performs a matching and processing procedure on the received user packet.

That a flow entry in the forwarding plane device is in an active state refers to that the flow entry in the forwarding plane device is allowed to participate in a matching and processing procedure performed on the user packet. The flow entries that are in the forwarding plane device and used for processing the user packet are activated only after all the flow entries that are needed to process the user packet are written into the corresponding flow tables; therefore, it is ensured that matching and processing is performed on the user packet only after all the flow entries that are needed to process the user packet are written into the corresponding flow tables.

In this implementation manner of the present invention, a flow entry installation message further carries an idle mark in addition to a flow entry, and a flow table identifier of a flow table in which the flow entry is located, so that a forwarding plane device sets a state of the flow entry to an idle state while writing the flow entry into the corresponding flow table. When the flow entry is in an invalid state, the flow entry is not allowed to participate in a matching and processing procedure performed on a user packet. Although flow entry installation messages reach the forwarding plane device asynchronously because of a network delay, and further, flow entries for processing the user packet are also written into corresponding flow tables asynchronously, states of the flow entries that are already written into the forwarding plane device and used to process the user packet are invalid states, and the flow entries do not participate in a matching and processing procedure performed on the user packet, avoiding that the user packet is wrongly processed because matching and processing performed on the user packet is triggered in a case in which not all flow entries for processing the user packet are present. The states of all the flow entries that are needed to process the user packet are set to an active state only after all the flow entries needed to process the user packet are written into the corresponding flow tables, to allow the flow entries to participate in processing performed on the user packet, thereby ensuring that matching and processing is performed on the user packet only when complete flow entries that are used to process the user packet exist in the forwarding plane device, and avoiding that the user packet is not sufficiently processed and the user packet becomes erroneous because matching and processing performed on the user packet is triggered in a case in which not all flow entries for processing the user packet are present.

Figure 9:
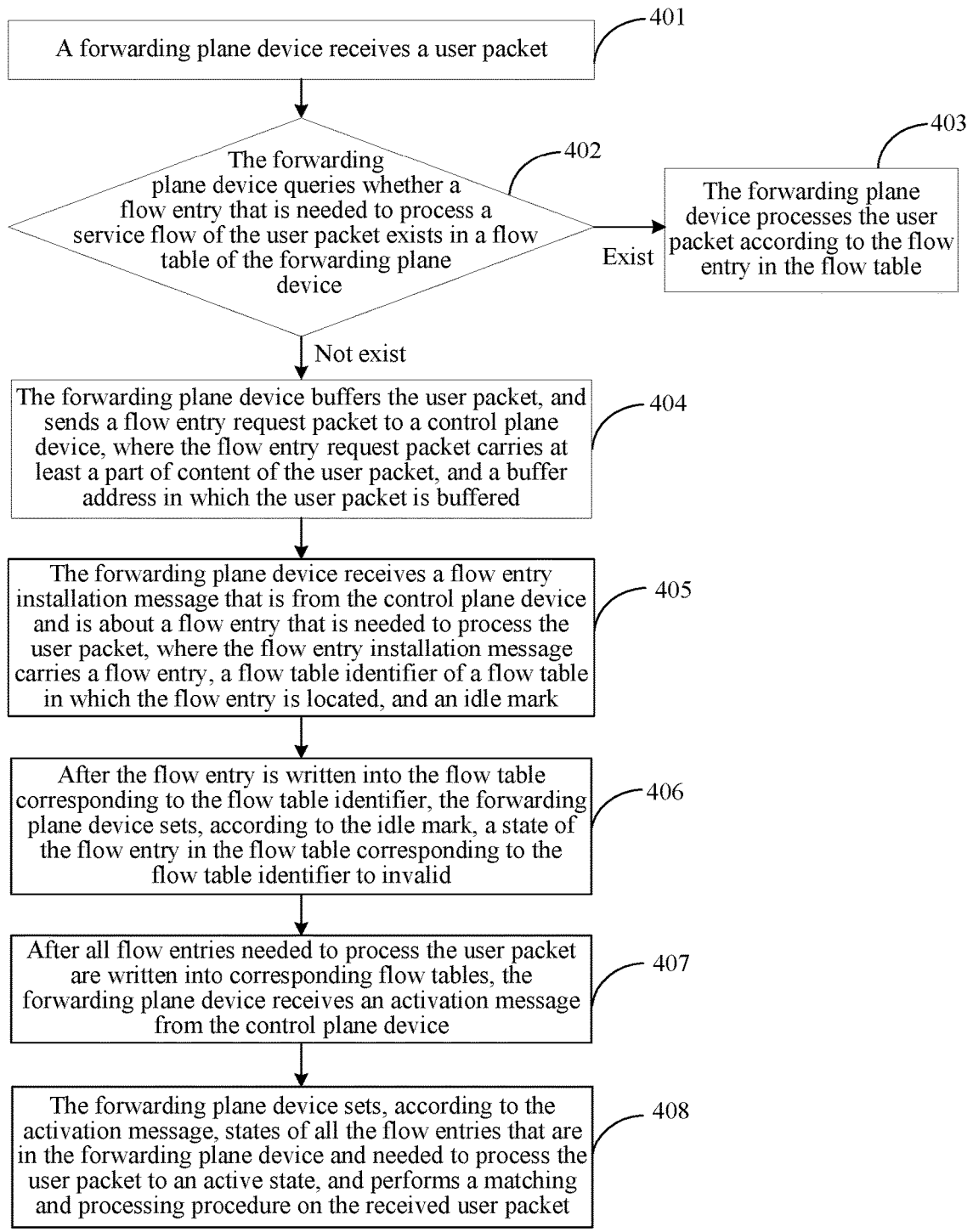
FIG. 9 is a flowchart of a fifth implementation manner of a user packet processing method according to the present invention.

Referring to FIG. 9, FIG. 9 is a flowchart of a fourth implementation manner of a user packet processing method according to the present invention. As shown in the figure, the method includes:

Step 401: A forwarding plane device receives a user packet.

The forwarding plane device is responsible for packet processing, the control plane device is responsible for logical control, and the control plane device delivers, to the forwarding plane device according to a need, a flow entry that is needed to process the user packet, so that the forwarding plane device performs a matching and processing procedure on the user packet according to the flow entry delivered by the control plane device.

Step 402: The forwarding plane device queries whether a flow entry that is needed to process the user packet exists in a flow table of the forwarding plane device; and if the flow entry that is needed to process the user packet does not exist, perform step 404; otherwise, perform step 403.

Generally, multiple flow tables are set in the forwarding plane device, and each flow table stores multiple flow entries. A flow entry includes a match condition and processing content, where the match condition is used to determine whether the user packet belongs to an object to be processed by using the flow entry, and the processing content is used to indicate processing that is performed on a user packet that meets the match condition. The forwarding plane device performs matching between a user packet and a match condition of a flow entry in an initial flow table; if the user packet matches the match condition, the user packet is processed according to processing content and is transferred to a next specified flow table after processing is completed; in the next specified flow table, matching between the user packet and a match condition of a flow entry in the flow table is performed; and if the user packet matches the match condition, the user packet is processed according to processing content and is transferred to a next specified flow table after processing is completed, and this process proceeds until matching and processing is completed.

Step 403: The forwarding plane device processes the user packet according to the flow entry in the flow table.

Step 404: The forwarding plane device sends a flow entry request packet to a control plane device, where the flow entry request packet carries at least a part of content of the user packet.

The at least a part of content of the user packet is content according to which the control plane device can define, according to the at least a part of content of the user packet after receiving the flow entry request packet, a flow entry that is needed to process the user packet, and the content is, for example, an IP quintuple, an Ethernet frame header, or an identifier of a local area network.

It should be noted that when the forwarding plane device finds that a flow entry that is needed to process the user packet does not exist, the user packet may not be buffered, the user packet is directly processed in a default processing manner, and no matching and processing procedure is performed.

Step 405: The forwarding plane device receives a flow entry installation message that is delivered by the control plane device according to the flow entry request packet and is needed during processing performed on the user packet.

There are multiple flow entry installation messages, and one flow entry installation message carries only one flow entry that is needed to process the user packet, one flow table identifier, and one idle mark.

Step 406: After a flow entry is written into a flow table corresponding to a flow table identifier, the forwarding plane device sets a state of the flow entry in the flow table to an idle state according to an idle mark.

The idle mark is used to instruct the forwarding plane device to set the state of the flow entry in the flow table to the idle state after the forwarding plane device writes the flow entry into the corresponding flow table, and that a flow entry in the forwarding plane device is in a state refers to that the flow entry in the forwarding plane device does not participate in a matching and processing procedure performed on the user packet.

Step 407: After all flow entries needed to process the user packet are written into corresponding flow tables, the forwarding plane device receives an activation message from the control plane device.

After sending all the flow entry installation messages, the control plane device sends the activation message after an interval of a predefined time, to ensure that the activation message reaches the forwarding plane device later than the flow entry installation messages, thereby ensuring that the forwarding plane device sets the flow entries that are in the forwarding plane device and needed to process the user packet to an active state according to the activation message only after all the flow entries needed to process the user packet are written into the corresponding flow tables.

Step 408: The forwarding plane device sets, according to the activation message, all the flow entries that are in the forwarding plane device and needed to process the user packet to an active state, and performs a matching and processing procedure on the received user packet.

That a flow entry in the forwarding plane device is in an active state refers to that the flow entry in the forwarding plane device is allowed to participate in a matching and processing procedure performed on the user packet. The flow entries that are in the forwarding plane device and used for processing the user packet are activated only after all the flow entries that are needed to process the user packet are written into the corresponding flow tables. Therefore, it is ensured that matching and processing is performed on the user packet only after all the flow entries that are needed to process the user packet are written into the corresponding flow tables.

In an implementation of the present invention, a flow entry includes a match condition and processing content, and the activation message carries match conditions in all the flow entries that are needed to process the user packet, and flow table identifiers of flow tables in which the flow entries are located. After receiving the activation message, the forwarding plane device finds a corresponding flow table according to a flow table identifier, searches the found flow table for a corresponding flow entry according to a match condition that is carried in the activation message, and sets a state of the found flow entry to an active state. In this case, step 408 may be specifically: the forwarding plane device finds a corresponding flow entry according to a flow table identifier and a match condition that are carried in the activation message, and sets a state of the flow entry to an active state; and after the states of all the flow entries that are needed to process the user packet have been set to an active state, the forwarding plane device performs a procedure of matching with a flow entry and processing on the user packet.

In another implementation of the present invention, a flow entry further includes a flow entry identifier in addition to a match condition and processing content, where the flow entry identifier is a unique mark of the flow entry, and flow entry identifiers of different flow entries are also different. The activation message carries flow entry identifiers of all the flow entries that are needed to process the user packet. Step 408 may also be specifically: the forwarding plane device finds a corresponding flow entry according to a flow entry identifier that is carried in the activation message, and sets a state of the flow entry to an active state; and after the states of all the flow entries that are needed to process the user packet have been set to an active state, the forwarding plane device performs a matching and processing procedure on the user packet.

Optionally, the control plane device may also actively deliver the flow entry installation message to the forwarding plane device. In this case, step 401 to step 404 may also not be included, and step 405 may be specifically: the forwarding plane device receives the flow entry installation message that is delivered by the control plane device according to triggering of user subscription information, a local policy, or an external trigger message, where the flow entry installation message carries a flow entry that is needed to process the user packet, a flow table identifier of a flow table in which the flow entry is located, and an idle mark.

In this implementation manner of the present invention, a flow entry installation message further carries an idle mark in addition to a flow entry, and a flow table identifier of a flow table in which the flow entry is located, so that a forwarding plane device sets a state of the flow entry to an idle state while writing the flow entry into the corresponding flow table. When the flow entry is in an invalid state, the flow entry is not allowed to participate in matching and processing performed on a user packet. Although flow entry installation messages reach a forwarding plane device asynchronously because of a network delay, and further, flow entries for processing the user packet are also written into corresponding flow tables asynchronously, states of the flow entries that are already written into the forwarding plane device and used to process the user packet are invalid states, and the flow entries do not participate in a matching and processing procedure performed on the user packet, avoiding that the user packet is not sufficiently processed and the user packet becomes erroneous because matching and processing performed on the user packet is triggered in a case in which not all flow entries for processing the user packet are present. The states of all the flow entries that are needed to process the user packet are set to an active state only after all the flow entries needed to process the user packet are written into the corresponding flow tables, to allow the flow entries to participate in processing performed on the user packet, thereby ensuring that a matching and processing procedure is performed on the user packet only when complete flow entries that are used to process the user packet exist in the forwarding plane device, and avoiding that the user packet is not sufficiently processed and the user packet becomes erroneous because matching and processing performed on the user packet is triggered in a case in which not all flow entries for processing the user packet are present.

What is claimed is:

1. A user packet processing method in a software defined network including a forwarding plane device and a control plane device, wherein the method comprises:
   receiving, by the forwarding plane device, a flow entry installation message from the control plane device, wherein a quantity of flow entry installation messages is one, and the flow entry installation message carries all flow entries that are needed to process a received user packet, and a flow table identifier of a flow table in which each flow entry of all the flow entries is located;
   writing, by the forwarding plane device, multiple flow entries into the flow tables corresponding to the flow table identifiers; and
   after the flow entries are written into the flow tables corresponding to the flow table identifiers, performing, by the forwarding plane device, a matching and processing procedure on the received user packet independently of network delay,
   wherein before the step of receiving, by the forwarding plane device, the flow entry installation message from the control plane device, the method further comprises:
   receiving, by the forwarding plane device, the received user packet, buffering the received user packet when it is found that a flow entry needed to process the received user packet does not exist in a flow table of the forwarding plane device, and sending a flow entry request packet to the control plane device, wherein the flow entry request packet carries at least a part of content of the received user packet and a buffer address in which the received user packet is buffered;
   wherein the step of receiving, by the forwarding plane device, the flow entry installation message from a control plane device comprises:
   receiving, by the forwarding plane device, the flow entry installation message that is delivered by the control plane device according to the flow entry request packet, wherein the flow entry installation message further carries the buffer address in which the received user packet is buffered; and
   wherein the step of performing, by the forwarding plane device, the matching and processing procedure on the received user packet comprises:
   extracting, by the forwarding plane device, the received user packet from buffer space corresponding to the buffer address, and performing the matching and processing procedure on the received user packet.

2. The method according to claim 1, wherein the step of receiving, by the forwarding plane device, the flow entry installation message from the control plane device comprises:
   receiving, by the forwarding plane device, the flow entry installation message that is delivered by the control plane device according to triggering by user subscription information, a local policy, or an external message.

3. A forwarding plane device in a software defined network, comprising: a processor and a receiver coupled to the processor;
   wherein the receiver is configured to receive a flow entry installation message from a control plane device, wherein a quantity of flow entry installation messages is one, and the flow entry installation message carries all flow entries that are needed to process a received user packet, and a flow table identifier of a flow table in which each flow entry of all the flow entries is located;

wherein the processor is configured to write the flow entries into the flow tables corresponding to the flow table identifiers; and perform a matching and processing procedure on the received user packet after the flow entries are written into the flow tables corresponding to the flow table identifiers independently of network delay, wherein the receiver is further configured to receive the received user packet;

wherein the processor is further configured to query whether a flow entry needed to process the received user packet exists in a flow table of the forwarding plane device and buffer the received user packet when the processor finds that the flow entry needed to process the received user packet does not exist in the flow table of the forwarding plane device; and wherein the forwarding plane device further comprises a transmitter configured to send a flow entry request packet to the control plane device when the processor finds that the flow entry needed to process the received user packet does not exist in the flow table of the forwarding plane device, wherein the flow entry request packet carries at least a part of content of the received user packet, and a buffer address in which the received user packet is buffered;

wherein the receiver is configured to receive the flow entry installation message that is delivered by the control plane device according to the flow entry request packet, wherein the flow entry installation message further carries the buffer address in which the received user packet is buffered; and wherein the processor is configured to: after all the flow entries needed to process the received user packet are written into the corresponding flow tables, extract the received user packet from buffer space corresponding to the buffer address, and perform the matching and processing procedure on the received user packet.

4. The forwarding plane device according to claim 3, wherein
the receiver is configured to receive the flow entry installation message that is delivered by the control plane device according to triggering by user subscription information, a local policy, or an external message.

5. A forwarding plane device in a software defined network, comprising: a processor and a receiver coupled to the processor;
wherein the receiver is configured to receive a flow entry installation message from a control plane device, wherein the flow entry installation message carries a flow entry that is needed to process a received user packet, a flow table identifier of a flow table in which the flow entry is located, and an idle mark; and the processor is configured to: after the flow entry is written into the flow table corresponding to the flow table identifier, set, according to the idle mark, a state of the flow entry in the flow table corresponding to the flow table identifier to an idle state;
wherein the receiver is further configured to: after all flow entries needed to process the received user packet are written into corresponding flow tables, receive an activation message from the control plane device; and the processor is further configured to set, according to the activation message, states of all the flow entries that are in the forwarding plane device and used for processing the received user packet to an active state, and perform a matching and processing procedure on the received user packet independently of network delay, wherein
the receiver is further configured to receive the received user packet;
the processor is further configured to query whether a flow entry needed to process the received user packet exists in a flow table of the forwarding plane device; and
wherein the forwarding plane device further comprises a transmitter configured to send a flow entry request packet to the control plane device when the processor finds that a flow entry needed to process the received user packet does not exist in a flow table of the forwarding plane device, wherein the flow entry request packet carries at least a part of content of the received user packet; and
the receiver is configured to receive the flow entry installation message that is delivered by the control plane device according to the flow entry request packet.

6. The forwarding plane device according to claim 5, wherein there are multiple flow entry installation messages, and one flow entry installation message carries only one flow entry that is needed to process the received user packet, one flow table identifier, and one idle mark.

7. The forwarding plane device according to claim 5, wherein
the flow entry comprises a match condition, and the activation message carries match conditions in all the flow entries that are needed to process the received user packet and flow table identifiers of the flow tables in which the flow entries are located; and
wherein the processor is configured to: find the flow entry according to the flow table identifiers and the match conditions that are carried in the activation message; set a state of the flow entry to an active state; and perform the matching and processing procedure on the received user packet after the states of all the flow entries that are needed to process the received user packet have been set to an active state.

8. The forwarding plane device according to claim 5, wherein
the flow entry comprises a flow entry identifier;
the activation message carries flow entry identifiers of all the flow entries that are needed to process the received user packet; and
wherein the processor is configured to: find the flow entry according to flow entry identifiers that are carried in the activation message; set a state of the flow entry to an active state; and perform the matching and processing procedure on the received user packet after the states of all the flow entries that are needed to process the received user packet have been set to an active state.

9. The forwarding plane device according to claim 5, wherein
the receiver is configured to receive the flow entry installation message that is delivered by the control plane device according to triggering by user subscription information, a local policy, or an external message.

* * * * *